United States Patent
Sakuma

(10) Patent No.: US 9,650,228 B2
(45) Date of Patent: May 16, 2017

(54) ROLLER GUIDE AND MANUFACTURING METHOD FOR SAME

(71) Applicant: Yoichi Sakuma, Chiyoda-ku (JP)

(72) Inventor: Yoichi Sakuma, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/422,569

(22) PCT Filed: Sep. 25, 2012

(86) PCT No.: PCT/JP2012/074537
§ 371 (c)(1),
(2) Date: Feb. 19, 2015

(87) PCT Pub. No.: WO2014/049685
PCT Pub. Date: Apr. 3, 2014

(65) Prior Publication Data
US 2015/0232301 A1    Aug. 20, 2015

(51) Int. Cl.
*B66B 7/04* (2006.01)
*B23P 19/04* (2006.01)

(52) U.S. Cl.
CPC .............. *B66B 7/046* (2013.01); *B23P 19/04* (2013.01); *Y10T 29/4956* (2015.01)

(58) Field of Classification Search
CPC ................................. B66B 7/046; B23P 19/04
USPC .......................................................... 187/410
See application file for complete search history.

(56) References Cited

U.S. PATENT DOCUMENTS

| 1,854,976 | A | * | 4/1932 | Brady | B66B 7/046 |
|---|---|---|---|---|---|
| | | | | | 187/406 |
| 2,100,169 | A | * | 11/1937 | Norton | B66B 7/046 |
| | | | | | 187/406 |
| 2,498,299 | A | * | 2/1950 | Rissler | B66B 7/046 |
| | | | | | 187/406 |
| 3,070,190 | A | * | 12/1962 | Rogers | B66F 9/12 |
| | | | | | 187/238 |
| 3,087,583 | A | * | 4/1963 | Bruns | B66B 7/046 |
| | | | | | 187/406 |

(Continued)

FOREIGN PATENT DOCUMENTS

| CN | 201520577 U | 7/2010 |
|---|---|---|
| JP | 51 22274 | 7/1976 |

(Continued)

OTHER PUBLICATIONS

Combined Office Action and Search Report issued Dec. 29, 2015 in Chinese Patent Application No. 201280076006.6 (with English language translation and English translation of Categories of Cited Documents).

(Continued)

*Primary Examiner* — Michael Riegelman
(74) *Attorney, Agent, or Firm* — Oblon, McClelland, Maier & Neustadt, L.L.P.

(57) ABSTRACT

A roller guide according to the present invention includes a frame mount surface portion and a roller mount surface portion to be mounted to a car, which are formed by plastically deforming a single steel plate. Thus, the number of components is reduced to significantly shorten assembly time. In addition, processing costs are also significantly lowered.

10 Claims, 9 Drawing Sheets

(56) References Cited

U.S. PATENT DOCUMENTS

| | | | | | |
|---|---|---|---|---|---|
| 3,099,334 | A | * | 7/1963 | Tucker, Jr. | B66B 7/046 187/406 |
| 3,554,327 | A | * | 1/1971 | Takamura | B66B 7/048 187/409 |
| 3,856,117 | A | * | 12/1974 | Solymos | B66B 7/046 187/406 |
| 5,107,963 | A | * | 4/1992 | Rocca | B66B 7/048 187/410 |
| 5,632,358 | A | * | 5/1997 | Maeda | B66B 7/046 187/410 |
| 6,050,370 | A | * | 4/2000 | Jung | B66B 7/048 187/409 |
| 6,345,698 | B1 | * | 2/2002 | Ravishankar | B66B 7/048 187/409 |
| 2005/0279585 | A1 | * | 12/2005 | Race | B66B 7/046 187/250 |
| 2014/0069746 | A1 | * | 3/2014 | Fargo | B66B 7/046 187/410 |
| 2014/0102833 | A1 | * | 4/2014 | Arai | B66B 7/048 187/410 |
| 2014/0158473 | A1 | * | 6/2014 | Arai | B66B 7/046 187/406 |
| 2015/0298938 | A1 | * | 10/2015 | Fargo | B66B 7/046 187/401 |
| 2015/0321885 | A1 | * | 11/2015 | Laughton | B66B 7/046 187/410 |

FOREIGN PATENT DOCUMENTS

| | | |
|---|---|---|
| JP | 57 89560 | 6/1982 |
| JP | 63 183177 | 11/1988 |
| JP | 4 313584 | 11/1992 |
| JP | 9 40321 | 2/1997 |
| JP | 2001 525307 | 12/2001 |
| JP | 2004 59205 | 2/2004 |

OTHER PUBLICATIONS

International Search Report Issued Nov. 13, 2012 in PCT/JP12/074537 Filed Sep. 25, 2012.

* cited by examiner

ROLLER GUIDE AND MANUFACTURING METHOD FOR SAME

TECHNICAL FIELD

The present invention relates to a roller guide for guiding a car and a counterweight of an elevator and a manufacturing method for the same.

BACKGROUND ART

Hitherto, there is known a roller guide formed by assembling components subjected to various types of machining (see, for example, Patent Literature 1).

CITATION LIST

Patent Literature

[PTL 1] JP 2001-525307 A

SUMMARY OF INVENTION

Technical Problem

The related-art roller guide includes a large number of components and therefore has a problem in that the assembly takes long time and processing costs increase.

The present invention has been made to solve the problem described above and has an object to provide a roller guide with a reduced number of components, significantly shortened assembly time, and significantly lowered processing costs, and to provide a manufacturing method for the same.

Solution to Problem

According to one embodiment of the present invention, there is provided a roller guide, which is to be mounted to an elevating body, for guiding the elevating body in a vertical direction along a guide rail extending in the vertical direction along a wall surface of a hoistway, the roller guide including:
  a roller rolling on the guide rail; and
  a guide frame for rotatably supporting the roller through an intermediation of a roller shaft,
    the guide frame including:
    a frame mount surface portion to be mounted to the elevating body; and
    a roller mount surface portion raised from the frame mount surface portion so as to be elastically displaceable in a direction away from the guide rail, the roller mount surface portion having the roller shaft mounted thereon,
  the frame mount surface portion and the roller mount surface portion being formed by plastically deforming a single steel plate.

Further, according to one embodiment of the present invention, there is provided a manufacturing method for the roller guide, the manufacturing method including the steps of:
  performing cutting work on the single steel plate having a planar shape into the frame mount surface portion and the roller mount surface portion before plastic deformation;
  raising the roller mount surface portion with respect to the frame mount surface portion; and
  fixing the roller shaft provided with the roller to the roller mount surface portion.

Advantageous Effects of Invention

According to the roller guide of the one embodiment of the present invention, the frame mount surface portion and the roller mount surface portion, which are to be mounted to the elevating body, are formed by plastically deforming the single steel plate. Therefore, the number of components is reduced to significantly shorten assembly time. In addition, processing costs are significantly lowered.

Further, according to the manufacturing method for the roller guide of the one embodiment of the present invention, the roller guide can be easily manufactured by plastically deforming the single steel plate.

DESCRIPTION OF EMBODIMENTS

Figure 1:
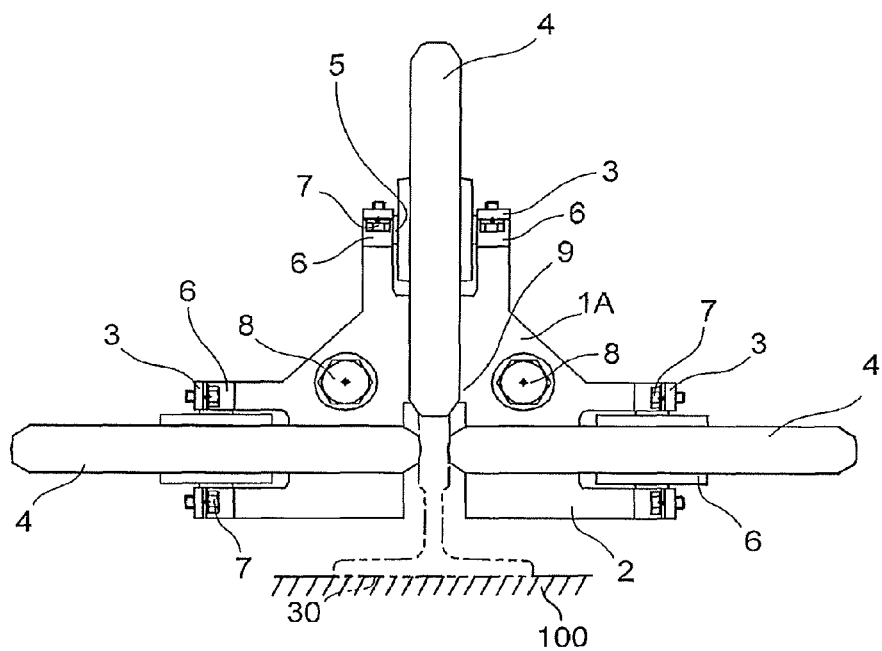
FIG. 1 is a plan view illustrating a roller guide according to a first embodiment of the present invention.

Referring to the drawings, embodiments of the present invention are described below. In the drawings, the same or corresponding components and parts are denoted by the same reference symbols in the descriptions.

First Embodiment

Figure 2:
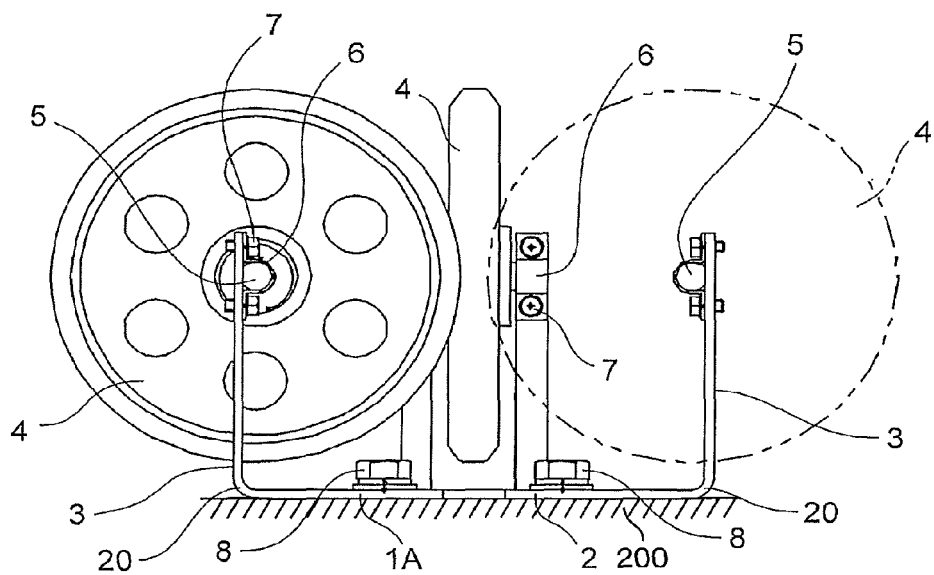
FIG. 2 is a front view of FIG. 1.

FIG. 1 is a plan view illustrating a roller guide according to a first embodiment of the present invention, and FIG. 2 is a front view of FIG. 1.

The roller guide according to the first embodiment includes a guide frame 1A and three rollers 4 rolling on a guide rail 30 extending vertically along a wall surface of a hoistway 100 of an elevator.

The guide frame 1A includes a frame mount surface portion 2 having a planar triangular shape, which is mounted to a car 200 corresponding to an elevating body, by mounting bolts 8, and a pair of roller mount surface portions 3 raised at 90° from each of end portions of the frame mount surface portion 2 so as to be elastically displaceable in a direction away from the guide rail 30.

A stopper portion 9 is formed on the frame mount surface portion 2 in proximity to the guide rail 30.

Between the pair of roller mount surface portions 3 that are opposed to each other, a roller shaft 5 is fixed to the roller mount surface portions 3 by fixing metal fittings 6 and roller mounting bolts 7. A roller 4, which is interposed between the pair of roller mount surface portions 3 and is rotatable relative to the roller shaft 5, is provided to the roller shaft 5.

The roller guide having the configuration described above is manufactured in the following procedure.

First, a planar steel plate is subjected to cutting work to be formed into the frame mount surface portion 2 and the roller mount surface portions 3 before being subjected to plastic deformation. After that, the roller mount surface portions 3 are raised at 90° relative to the frame mount surface portion 2 by the plastic deformation.

Thereafter, between each of the pairs of roller mount surface portions 3, which respectively extend in three directions, the roller shaft 5 provided with the roller 4 is fixed by using the fixing metal fittings 6 and the roller mounting bolts 7 to complete the roller guide.

In the roller guide according to this embodiment, the roller mount surface portions 3 have a cantilever structure with respect to the frame mount surface portion 2.

Therefore, when the car vibrates while running, the roller mount surface portions 3 are elastically displaced (swung) with bent portions 20 between the frame mount surface portion 2 and the roller mount surface portion 3 as respective fulcra, which is equivalent to anti-vibration support of the car.

Further, the frame mount surface portion 2 and the roller mount surface portions 3, which are raised from the frame mount surface portion 2 so as to be elastically displaceable in a direction away from the guide rail 30, are formed of a single steel plate.

As can be understood from the description given above, in contrast to the roller guide described in Patent Literature 1, which has a complex mechanism, the roller guide having anti-vibration performance with a reduced number of components, significantly shortened assembly time, and significantly lowered processing costs can be provided.

Further, in case of emergency such as earthquake, there is a possibility that a large load in a horizontal direction may act on the roller mount surface portions 3 through the guide rail 30 and the rollers 4 so that the roller mount surface portions 3 are significantly displaced to be plastically deformed.

To address this problem, the guide rail 30 collides against the stopper portion 9 formed on the frame mount surface portion 2 in proximity to the guide rail 30. Therefore, further horizontal movement of the guide rail 30 is suppressed. Thus, the roller mount surface portions 3 are prevented from being significantly displaced to be plastically deformed.

In the roller guide according to the embodiment described above, the three rollers 4 are provided to the integral guide frame 1A. However, the guide frame 1A may be divided into three for the respective rollers 4.

Second Embodiment

Figure 3:
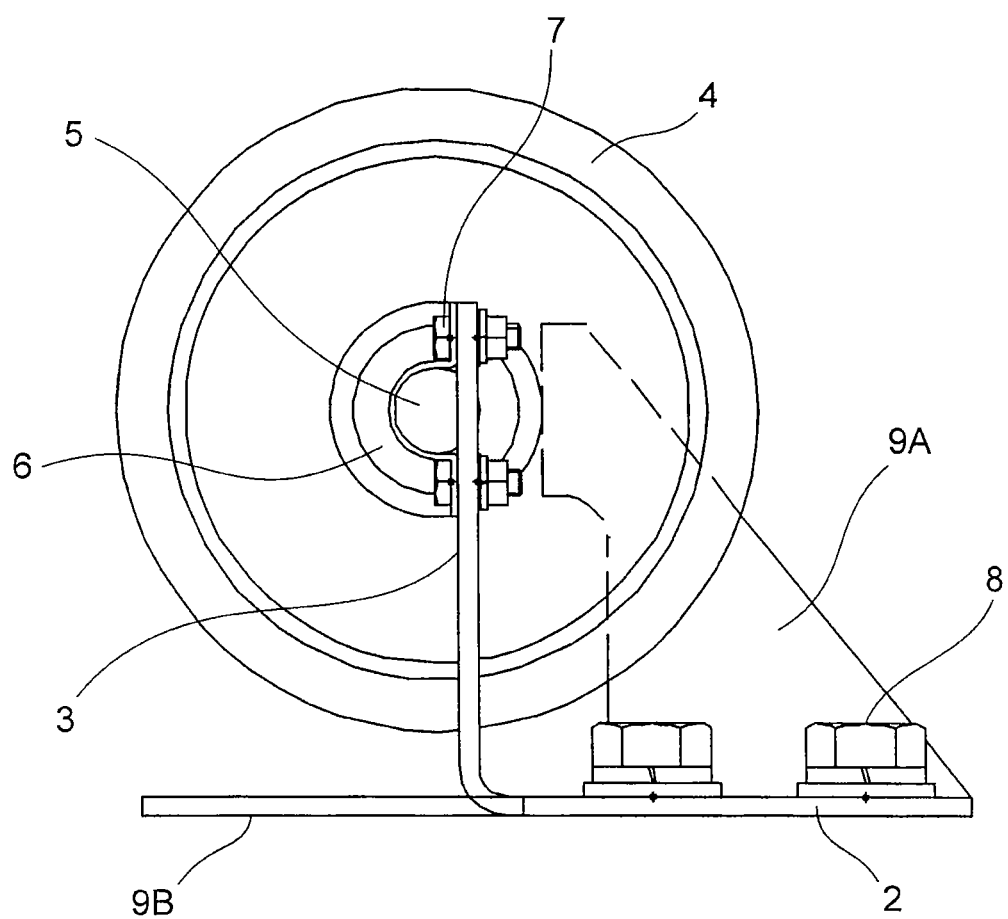
FIG. 3 is a front view illustrating a roller guide according to a second embodiment of the present invention.
Figure 4:
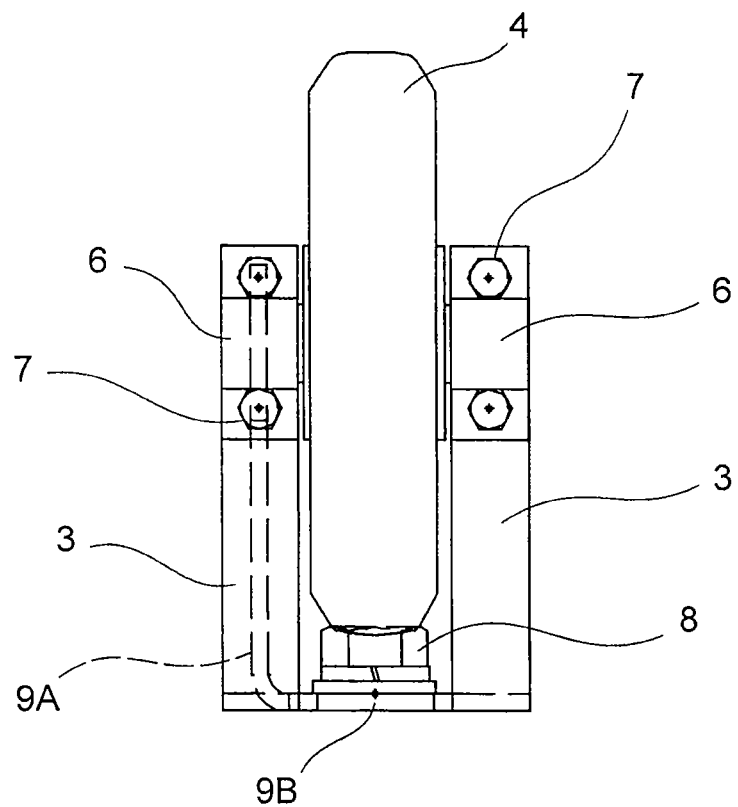
FIG. 4 is a left side view of FIG. 3.
Figure 5:
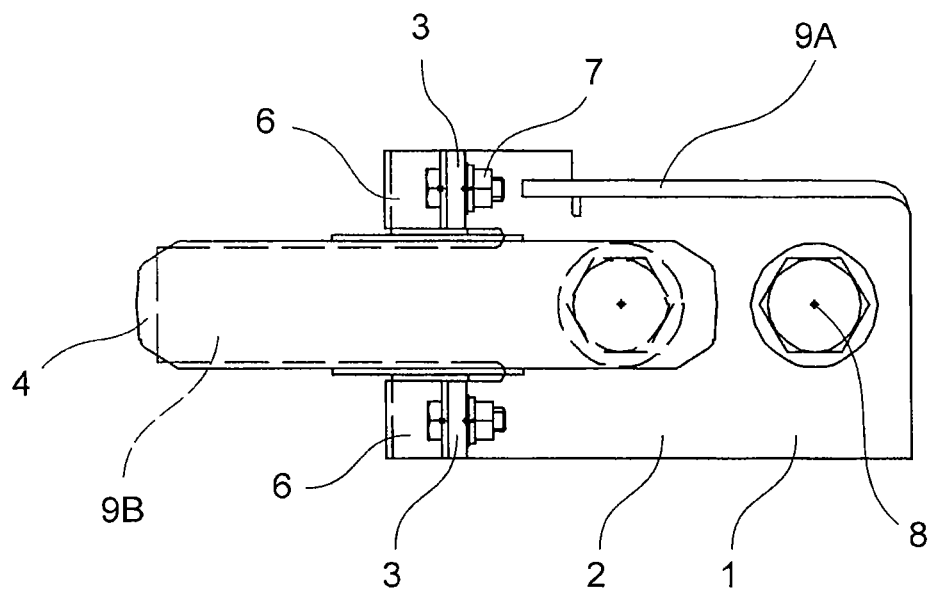
FIG. 5 is a plan view of FIG. 3.

FIG. 3 is a front view illustrating a roller guide according to a second embodiment of the present invention, FIG. 4 is a left side view of FIG. 3, and FIG. 5 is a plan view of FIG. 3.

In the roller guide of this embodiment, each of the rollers 4 is provided to an individual guide frame 1.

On an edge portion of one side of the frame mount surface portion 2, a first stopper portion 9A is formed so as to be raised at 90° with its distal end portion opposed to the roller mount surface portion 3. Further, on the frame mount surface portion 2, a second stopper portion 9B having a distal end portion extending horizontally is formed between the pair of roller mount surface portions 3 opposed to each other.

In case of emergency such as earthquake, it is conceivable that a large load in the horizontal direction may act on the roller mount surface portion 3 so that the roller mount surface portion 3 is plastically deformed. However, the first stopper portion 9A interferes with the roller mount surface portion 3 and the second stopper portion 9B interferes with the roller 4 so that the roller mount surface portion 3 is prevented from being further plastically deformed.

The frame mount surface portion 2 having the stopper portions 9A and 9B and the roller mount surface portions 3 are formed of a single planar steel plate.

Only any one of the stopper portions 9A and 9B needs to be formed. Further, when a mechanism for restricting the displacement of the roller mount surface portions 3 is provided additionally, the stopper portions may be omitted.

The remaining configuration is the same as that of the roller guide of the first embodiment.

The same effects as those obtained by the roller guide of the first embodiment are obtained. The roller guide having the anti-vibration performance with a reduced number of components, significantly shortened assembly time, and significantly lowered processing costs can be obtained.

Third Embodiment

Figure 6:
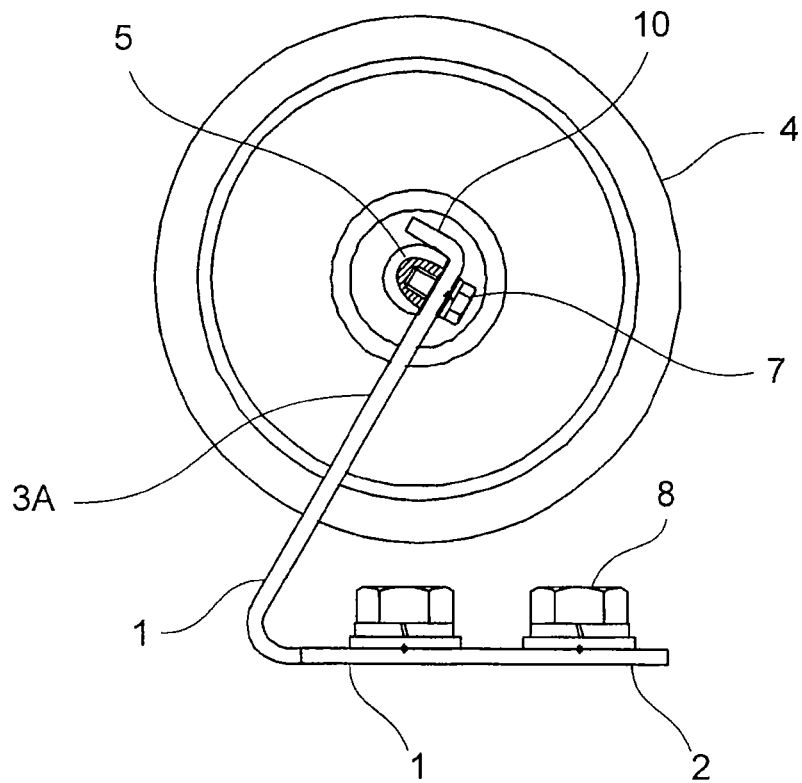
FIG. 6 is a front view illustrating a roller guide according to a third embodiment of the present invention.
Figure 7:
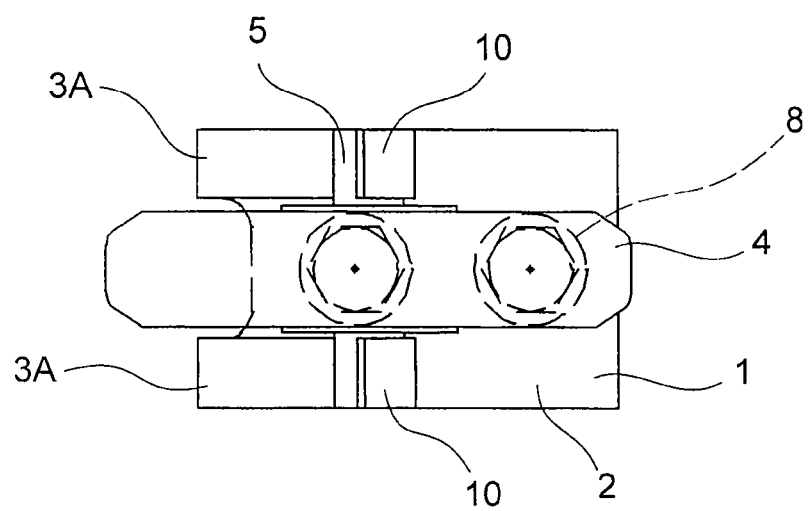
FIG. 7 is a plan view of FIG. 6.

FIG. 6 is a front view illustrating a roller guide according to a third embodiment of the present invention, and FIG. 7 is a plan view of FIG. 6.

When the car is lightweight and a full length of the roller mount surface portions 3 becomes shorter, stiffness of the roller mount surface portions 3 increases to increase a natural frequency. As a result, it is difficult to obtain the anti-vibration performance.

In this case, the anti-vibration performance can be ensured by increasing the full length of the roller mount surface portions 3 to lower the stiffness so as to reduce the natural frequency. However, the dimension of the roller guide in a height direction is undesirably increased.

In the roller guide of this embodiment, roller mount surface portions 3A are bent by about 120° with respect to the frame mount surface portion 2 in a direction away from the guide rail 30.

Further, a receiving portion 10, which is bent by 90° toward the roller shaft 5, is formed at an end portion of the roller mount surface portion 3A. The receiving portion 10 has two surfaces held in contact with the roller shaft 5.

Both end portions of the roller shaft 5, which is provided between the pair of the roller mount surface portions 3A, are fixed to the roller mount surface portions 3A by the roller mounting bolts 7. The roller 4 is provided to the roller shaft 5 so as to be rotatable.

According to the roller guide of this embodiment, the roller mount surface portion 3A is bent by an angle exceeding 90° in a direction away from the guide rail 30 with respect to the fame mount surface portion 2. As a result, not only the length of the roller mount surface portions 3A is obtained, which is necessary to ensure the anti-vibration performance by lowering the stiffness so as to reduce the natural frequency, but also the dimension of the roller guide in the height direction can be reduced.

An exciting force is input to the roller 4 from the guide rail 30 in a direction from left to right in FIG. 6. The roller shaft 5 is held in contact with the two surfaces of the receiving portion 10 of the roller mount surface portion 3A. Thus, the roller 4 is stably supported with respect to the roller mount surface portion 3A.

Further, the force input to the roller 4 acts in a direction in which the roller mount surface portion 3A is elastically displaced. Even when the roller mounting bolts 7 become loose, the roller shaft 5 is biased toward the receiving portion 10. Therefore, the roller 4 can be prevented from dropping off.

The remaining configuration is the same as that of the roller guide of the second embodiment. Further, for the effects, the same effects as those obtained by the roller guide of the second embodiment can be obtained.

Fourth Embodiment

Figure 8:
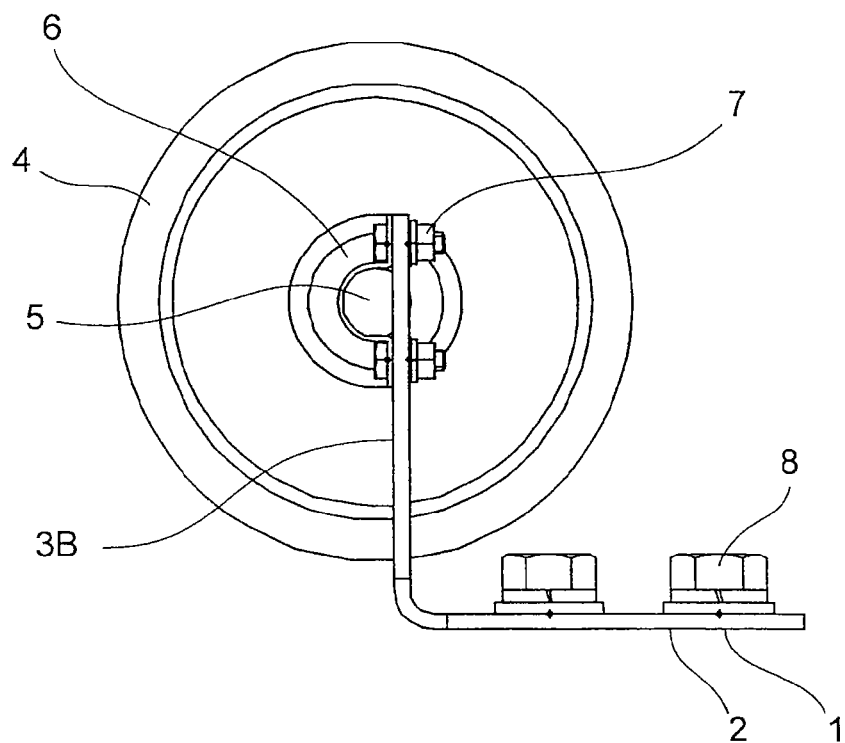
FIG. 8 is a front view illustrating a roller guide according to a fourth embodiment of the present invention.
Figure 9:
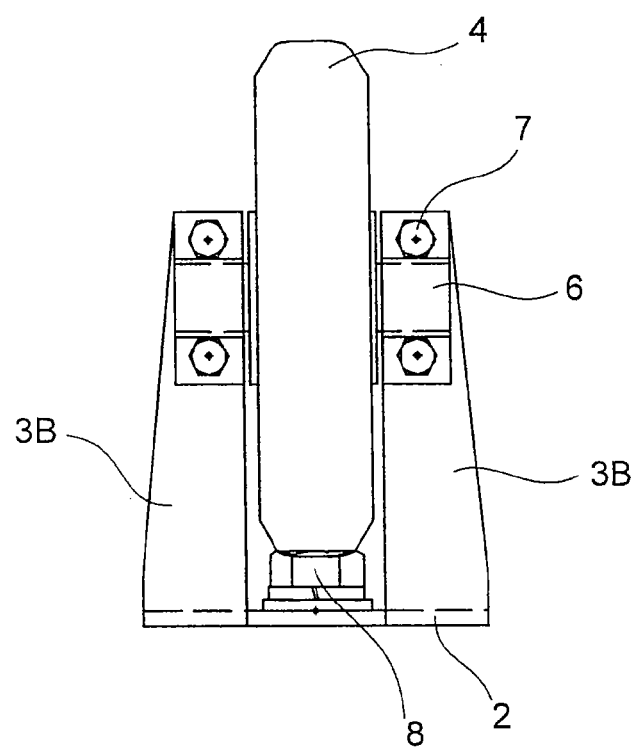
FIG. 9 is a left side view of FIG. 8.

FIG. 8 is a front view illustrating a roller guide according to a fourth embodiment of the present invention, and FIG. 9 is a left side view of FIG. 8.

In this embodiment, a roller mount surface portion 3B has a width dimension increasing toward the frame mount surface portion 2.

When a weight of the car is large, required stiffness of a cantilever cannot be obtained on the roller mount surface portion having a uniform plate thickness in some cases.

In the roller guide of this embodiment, the roller mount surface portion 3B has the width dimension increasing toward the frame mount surface portion 2 on which a larger moment acts. Therefore, the required stiffness of the cantilever is ensured.

The remaining configuration is the same as that of the roller guide of the second embodiment. Further, for the effects, the same effects as those obtained by the roller guide of the second embodiment can be obtained.

Fifth Embodiment

Figure 10:
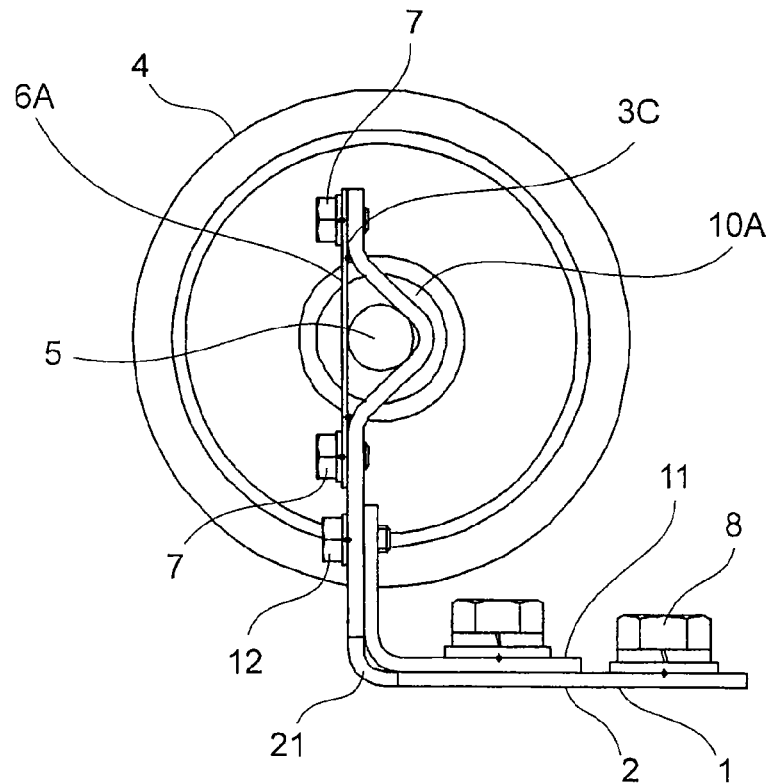
FIG. 10 is a front view illustrating a roller guide according to a fifth embodiment of the present invention.
Figure 11:
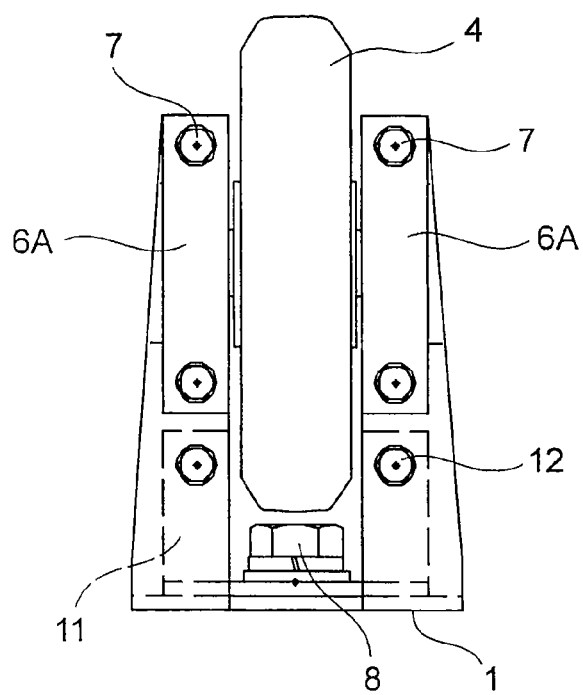
FIG. 11 is a left side view of FIG. 10.

FIG. 10 is a front view illustrating a roller guide according to a fifth embodiment of the present invention, and FIG. 11 is a left side view of FIG. 10.

In this embodiment, an auxiliary frame 11 having an L-like shape is superimposed on a bent portion 21 between the frame mount surface portion 2 and a roller mount surface portion 3C.

The auxiliary frame 11 is fixed onto the roller mount surface portion 3C by an auxiliary bolt 12 and is fixed to the frame mount surface portion 2 by fastening both of the auxiliary frame 11 and the frame mount surface portion 2 with the mounting bolt 8.

The roller mount surface portion 3C has a receiving portion 10A on a side opposite to the guide rail 30, which protrudes in a V-like shape and is held in contact with the roller shaft 5 at two points. The roller shaft 5 is interposed between the receiving portion 10A and a fixing metal fitting 6A fixed to the roller mount surface portion 3C by the roller mounting bolts 7 so as to be supported by the roller mount surface portion 3C.

When the weight of the car is large, large return bending repeatedly acts on the bent portion 21. Therefore, not only short-term strength but also fatigue breakdown is required to be taken into consideration.

In this embodiment, the auxiliary frame 11 is superimposed on the bent portion 21 of the guide frame 1 to reinforce the bent portion 21. A fluctuating load input to the roller 4 is partially dispersed by the auxiliary frame 11 to reduce a stress amplitude generated in the roller mount surface portion 3C. Thus, the anti-vibration performance can be ensured with a simple structure.

Further, the roller shaft 5 is interposed between the receiving portion 10A and the fixing metal fitting 6A so as to be supported by the roller mount surface portion 3C. The load applied from the guide rail 30 to the roller 4 is received by a valley portion of the receiving portion 10A having a V-like shape. Thus, even if the fixing metal fitting 6A comes off the roller mount surface portion 3C, the roller 4 is prevented from dropping off.

The remaining configuration is the same as that of the roller guide of the second embodiment. Further, for the effects, the same effects as those obtained by the roller guide of the second embodiment can be obtained.

Sixth Embodiment

Figure 12:
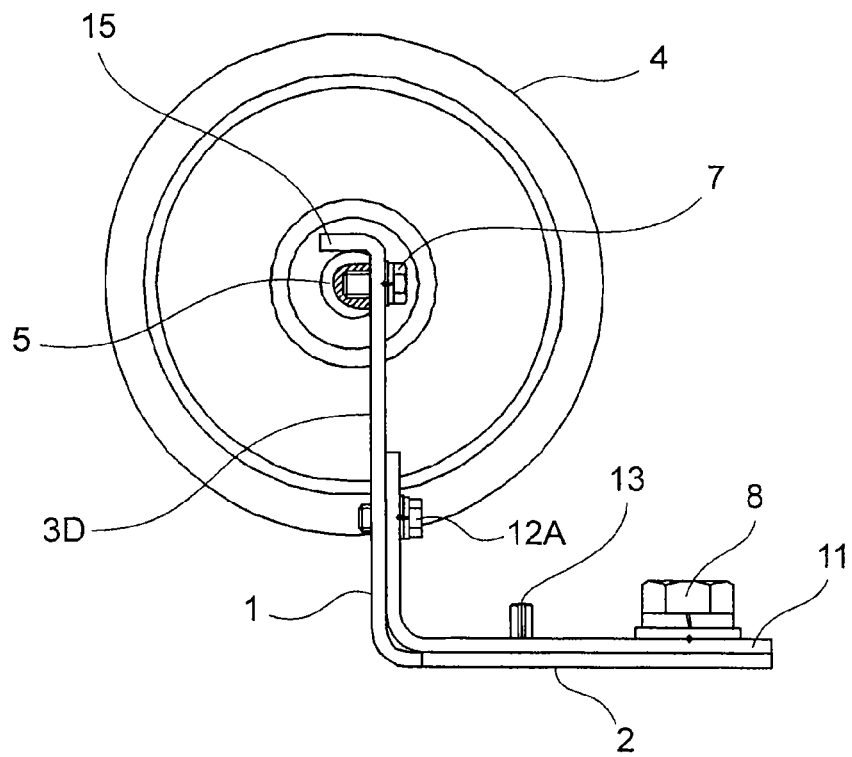
FIG. 12 is a front view illustrating a roller guide according to a sixth embodiment of the present invention.
Figure 13:
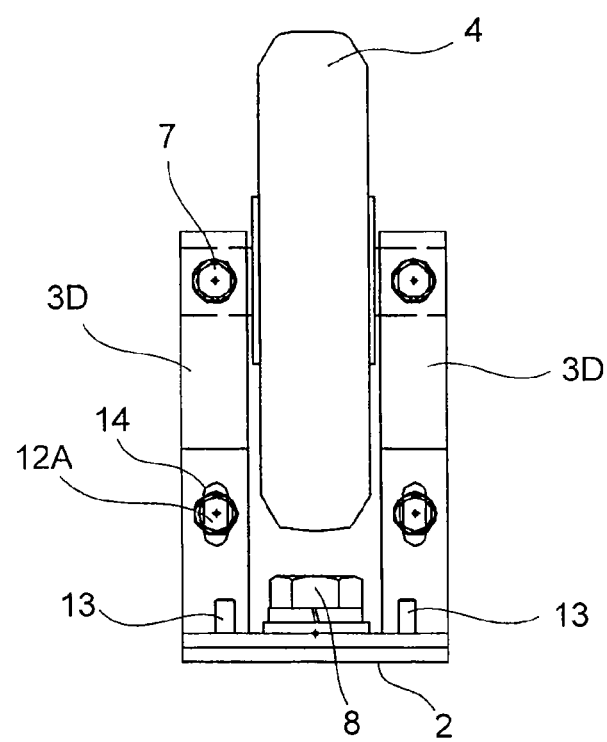
FIG. 13 is a right side view of FIG. 12.
Figure 14:
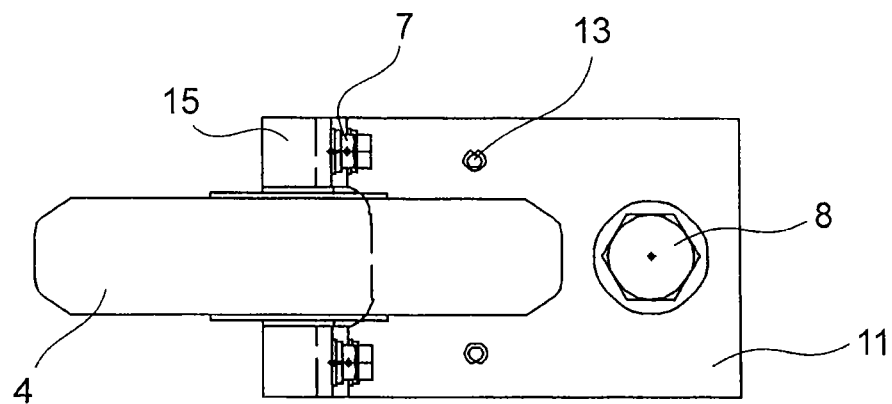
FIG. 14 is a plan view of FIG. 12.

FIG. 12 is a front view illustrating a roller guide according to a sixth embodiment of the present invention, FIG. 13 is a right side view of FIG. 12, and FIG. 14 is a plan view of FIG. 12.

In this embodiment, the roller shaft 5 is provided between a pair of roller mount surface portions 3D opposed to each other. Both end portions of the roller shaft 5 are fixed to both of the roller mount surface portions 3D by the roller mounting bolts 7. The roller 4 is provided to the roller shaft 5 so as to be rotatable.

The auxiliary frame 11 having an L-like shape is superimposed on the entire region of the frame mount surface portion 2 and lower half regions of the roller mount surface portions 3D.

The auxiliary frame 11 is fixed to the frame mount surface portion 2 by fastening both of the auxiliary frame 11 and the frame mount surface portion 2 with the mounting bolt 8. A shift is prevented from occurring therebetween by a pair of spring pins 13.

In a region of the auxiliary frame 11 on the side of the roller mount surface portions 3D, elongated holes 14 are formed. In the elongated holes 14, auxiliary bolts 12A are provided, which serve as contact-pressure adjusting means having distal end portions screwed into the roller mount surface portions 3D. With head portions of the auxiliary bolts 12A, raised portions of the auxiliary frame 11 press the roller mount surface portions 3D.

In this embodiment, the auxiliary frame 11 is superimposed on the roller mount surface portions 3D. Further, when the roller mount surface portions 3D are elastically displaced (swung), slippage occurs therebetween.

Thus, while controlling a state of a surface roughness, plating, and the like on a contact surface between the roller mount surface portions 3D and the auxiliary frame 11, the auxiliary frame 11 is pressed against the roller mount surface portions 3D by the head portions of the auxiliary bolts 12A to adjust a contact pressure between the roller mount surface portions 3D and the auxiliary frame 11. In this manner, the slippage can be converted into a friction resistance.

Thus, a damping force to the swing of the roller mount surface portions 3D is obtained. Thus, riding comfort in the car can be improved.

The remaining configuration is the same as that of the roller guide of the second embodiment. Further, for the effects, the same effects as those obtained by the roller guide of the second embodiment can be obtained.

Seventh Embodiment

Figure 15:
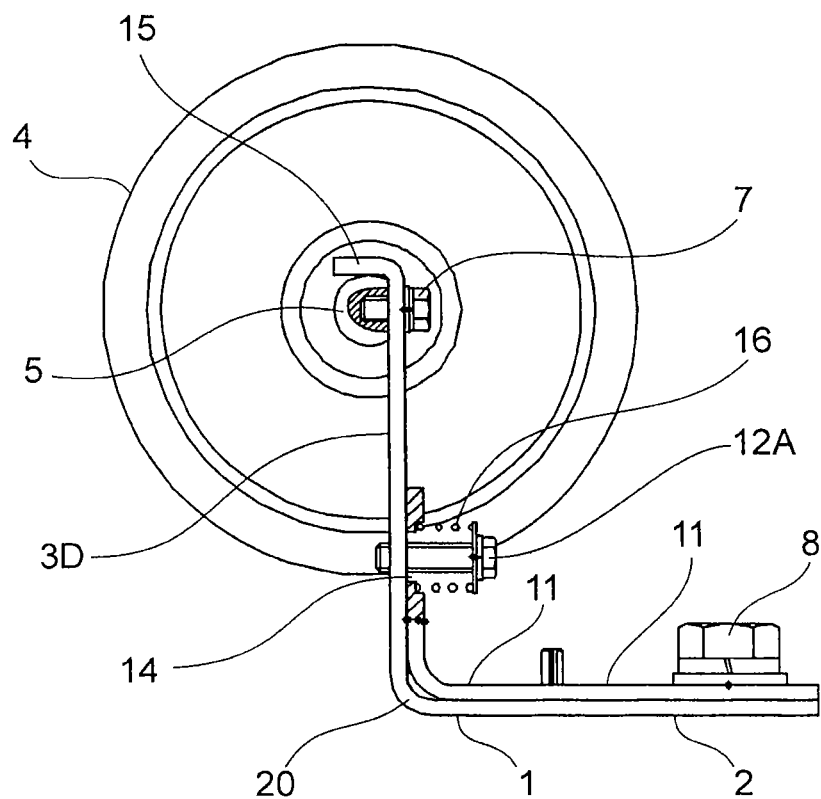
FIG. 15 is a front view illustrating a roller guide according to a seventh embodiment of the present invention.

FIG. 15 is a front view illustrating a roller guide according to a seventh embodiment of the present invention.

In this embodiment, a coil spring 16 having a high linearity is provided between the head portion of the auxiliary bolt 12A and the auxiliary frame 11.

In the case of the roller guide according to the sixth embodiment, the contact pressure between the roller mount surface portion 3D and the auxiliary frame 11 is adjusted by controlling a torque of the auxiliary bolt 12A, which provides an advantage in a simple configuration. However, there is a disadvantage in difficulty of fine adjustment of the contact pressure.

On the other hand, in the roller guide of this embodiment, the coil spring 16 having the amount of expansion and contraction proportional to the load is provided between the head portion of the auxiliary bolt 12A and the auxiliary frame 11. Thus, by the amount of fastening of the auxiliary bolt 12A, the contact pressure between the roller mount surface portion 3D and the auxiliary frame 11 can be finely adjusted in a simple manner.

In addition, by controlling the surface roughness, the plating, and the like on the contact surface between the roller mount surface portion 3D and the auxiliary frame 11, a friction coefficient and a contact force can be both controlled. Thus, a necessary damping force can be easily adjusted. Thus, the riding comfort in the car can be improved.

Eighth Embodiment

Figure 16:
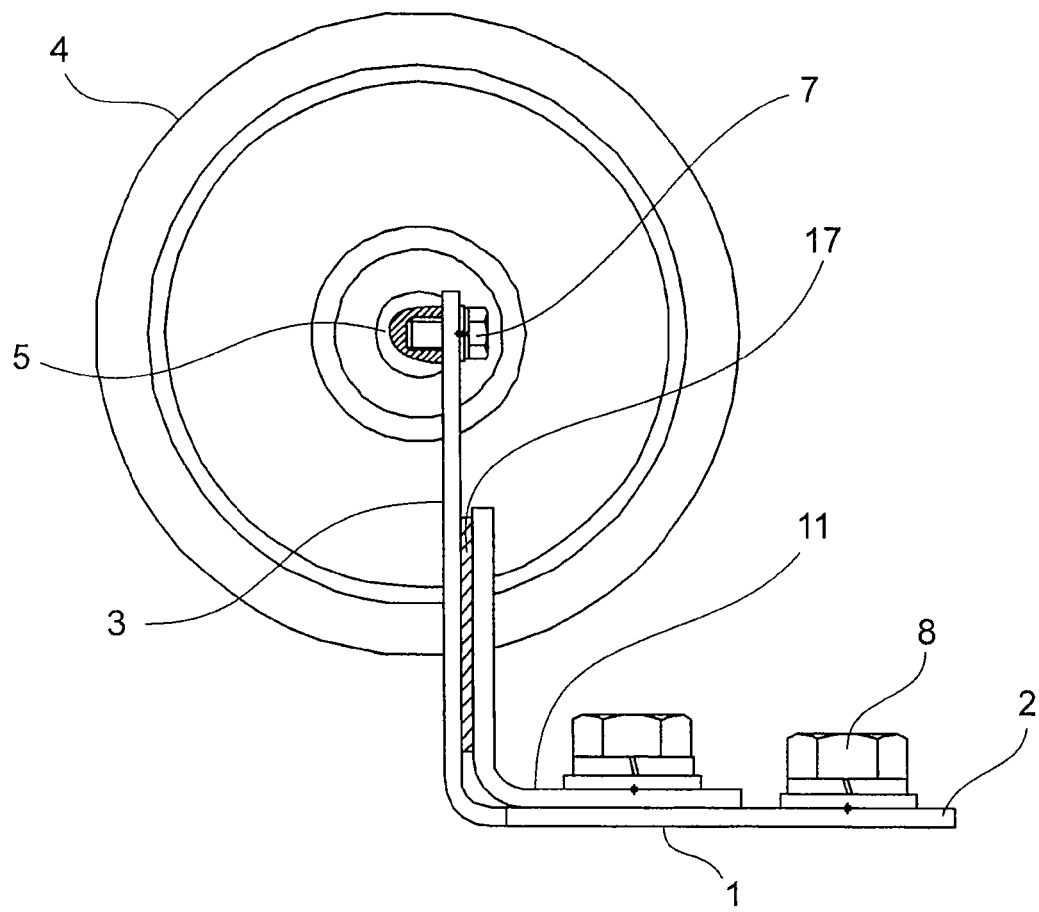
FIG. 16 is a front view illustrating a roller guide according to an eighth embodiment of the present invention.

FIG. 16 is a front view illustrating a roller guide according to an eighth embodiment of the present invention.

In this embodiment, a resin 17 (for example, a viscoelastic damper) having a high hysteresis is provided by bonding between the roller mount surface portion 3 and the auxiliary frame 11.

In this embodiment, the roller mount surface portion 3 is elastically displaced (swung) with each of the bent portions 20 as a fulcrum while the elevator is running. As a result, a relative displacement occurs between the roller mount surface portion 3 and the auxiliary frame 11. In this case, the resin 17 having a high hysteresis is provided therebetween. A resistance due to the relative displacement is generated to obtain the damping force for the elastic displacement of the roller mount surface portion 3. Thus, excellent riding comfort in the car is provided.

In each of the embodiments described above, the car of the elevator has been described as the elevating body. However, it is apparent that the present invention is also applicable to a roller guide for guiding running of a counterweight being an elevating body.

Further, although the auxiliary bolts 12A are used as the contact-pressure adjusting means, it is apparent that the contact-pressure adjusting means is not limited thereto.

REFERENCE SIGNS LIST 1, 1A guide frame, 2 frame mount surface portion, 3, 3A, 3B, 3C, 3D roller mount surface portion, 4 roller, 5 roller shaft, 6, 6A fixing metal fitting, 7 roller mounting bolt, 8 mounting bolt, 9, 9A, 9B stopper portion, 10, 10A receiving portion, 11 auxiliary frame, 12 auxiliary bolt, 12A auxiliary bolt (contact-pressure adjusting means), 13 spring pin, 14 elongated hole, 16 coil spring, 17 resin, 20 bent portion, 21 bent portion, 30 guide rail.

The invention claimed is:

1. A roller guide to be mounted to an elevating body, for guiding the elevating body along a guide rail extending in the vertical direction along a wall surface of a hoistway, the roller guide comprising:
   a roller rolling on the guide rail; and
   a guide frame rotatably supporting the roller,
   the guide frame comprising a single planar member made of a plastically deformable material having elasticity, the planar member comprising a frame mount surface portion to be mounted relative to the elevating body, a roller mount surface portion, and a plastically bent portion joining the frame mount surface portion and one end of the roller mount surface portion, the plastically bent portion being bent such that the roller mount surface portion is angled with respect to the frame mount surface portion and is separated from the elevating body,
   wherein the roller mount surface portion is not supported except by the connection of its one end to the frame mount surface portion at the plastically bent portion, whereby the roller mount surface portion comprises an elastically deformable cantilever structure mounted at the one end thereof to the frame mount surface portion,
   wherein the roller is rotatably mounted to the roller mount surface portion at a portion of the roller mount surface portion which is spaced from said end, such that the elastic deformation of the cantilever structure displaces the roller in a direction toward or away from the guide rail,
   wherein the guide frame comprises a stopper formed in proximity to the guide rail for regulating the elastic displacement of the roller mount surface portion, wherein the stopper is positioned in proximity to the guide rail such that the stopper interferes with the roller mount surface portion before the roller mount surface portion is plastically deformed.

2. The roller guide according to claim 1, wherein the roller mount surface portion is bent by an angle exceeding 90° in a direction away from the guide rail with respect to the frame mount surface portion.

3. The roller guide according to claim 1, wherein:
   the roller mount surface portion comprises a receiving portion, which is bent so as to receive a roller shaft therein; and
   when the roller mount surface portion is elastically displaced in the direction away from the guide rail, the roller shaft is biased in the direction of the elastic displacement.

4. The roller guide according to claim 1, wherein the roller mount surface portion has a width dimension gradually increasing toward the frame mount surface portion.

5. The roller guide according to claim 1, wherein the guide frame comprises an auxiliary frame provided so as to be superimposed at least on the bent portion between the frame mount surface portion and the roller mount surface portion.

6. The roller guide according to claim 5, further comprising contact-pressure adjusting means for adjusting a contact pressure between the roller mount surface portion and the auxiliary frame by pressing the auxiliary frame against the roller mount surface portion, the contact-pressure adjusting means being provided at a portion of the auxiliary frame, which is held in surface contact with the roller mount surface portion, wherein the contact-pressure adjusting means adjusts a friction force generated by a relative displacement between the roller mount surface portion and the auxiliary frame, which is caused by the elastic displacement of the roller mount surface portion.

7. The roller guide according to claim 6, wherein the contact-pressure adjusting means comprises an auxiliary bolt screwed into the roller mount surface portion through an elongated hole formed in the auxiliary frame, the auxiliary bolt having a head portion for pressing a circumferential edge portion of the elongated hole.

8. The roller guide according to claim 7, further comprising a spring having an amount of expansion and contraction proportional to a load, the spring being provided between the head portion of the auxiliary bolt and the auxiliary frame.

9. The roller guide according to claim 5, further comprising a resin having a high hysteresis, the resin being provided between the roller mount surface portion and the auxiliary frame.

10. A roller guide engageable with a guide rail extending in the vertical direction, to guide a body along the guide rail, the roller guide comprising:

a roller rolling on the guide rail; and a guide frame rotatably supporting the roller, the guide frame comprising a single planar member made of a plastically deformable material having elasticity, the planar member comprising a frame mount surface portion to be mounted relative to a body to be guided, a roller mount surface portion, and a plastically bent portion joining the frame mount surface portion and one end of the roller mount surface portion, the plastically bent portion being bent such that the roller mount surface portion is angled with respect to the frame mount surface portion and is separated from the body to be guided, wherein the roller mount surface portion is not supported except by the connection of its one end to the frame mount surface portion at the plastically bent portion, whereby the roller mount surface portion comprises an elastically deformable cantilever structure mounted at the one end thereof to the frame mount surface portion, wherein the roller is rotatably mounted to the roller mount surface portion at a portion of the roller mount surface portion which is spaced from said end, such that the elastic deformation of the cantilever structure displaces the roller in a direction toward or away from the guide rail, wherein the guide frame comprises a stopper formed in proximity to the guide rail for regulating an elastic displacement of the roller mount surface portion wherein the stopper is positioned in proximity to the guide rail such that the stopper interferes with the roller mount surface portion before the roller mount surface portion is plastically deformed.

\* \* \* \* \*